(12) United States Patent
Phuyal et al.

(10) Patent No.: US 6,856,897 B1
(45) Date of Patent: Feb. 15, 2005

(54) METHOD AND SYSTEM FOR COMPUTING ROAD GRADE DATA

(75) Inventors: Bishnu Phuyal, DesPlaines, IL (US); Narayanan Alwar, Bloomingdale, IL (US); Ole Henry Dorum, Chicago, IL (US)

(73) Assignee: Navteq North America, LLC, Chicago, IL (US)

( * ) Notice: Subject to any disclaimer, the term of this patent is extended or adjusted under 35 U.S.C. 154(b) by 0 days.

(21) Appl. No.: 10/667,769

(22) Filed: Sep. 22, 2003

(51) Int. Cl.$^7$ .............................................. G06C 21/00
(52) U.S. Cl. .................. 701/208; 701/209; 340/995.24
(58) Field of Search ............................... 701/208, 200, 701/206, 209, 25, 26; 73/178 R; 340/995.24

(56) References Cited

U.S. PATENT DOCUMENTS

| | | | |
|---|---|---|---|
| 3,752,251 A | 8/1973 | Gaeke | 180/104 |
| 5,574,649 A | 11/1996 | Levy | 364/449 |
| 5,646,857 A | 7/1997 | McBurney et al. | 364/449.7 |
| 6,047,234 A | 4/2000 | Cherveny et al. | 701/200 |
| 6,278,928 B1 * | 8/2001 | Aruga et al. | 701/65 |
| 6,366,851 B1 * | 4/2002 | Chojnacki et al. | 701/208 |
| 6,405,120 B1 * | 6/2002 | Higashimata et al. | 701/96 |
| 6,442,453 B1 * | 8/2002 | Fukuoka | 701/1 |
| 6,484,086 B2 | 11/2002 | Jeon | 701/93 |
| 6,529,827 B1 | 3/2003 | Beason et al. | 701/213 |
| 6,597,981 B2 * | 7/2003 | Nishira et al. | 701/96 |
| 6,674,434 B1 * | 1/2004 | Chojnacki et al. | 345/428 |
| 6,735,542 B1 | 5/2004 | Burgett et al. | 702/85 |
| 2002/0069010 A1 * | 6/2002 | Nishira et al. | 701/96 |
| 2002/0161513 A1 * | 10/2002 | Bechtolsheim et al. | 701/208 |
| 2002/0165669 A1 | 11/2002 | Pinto et al. | 701/213 |
| 2003/0033071 A1 | 2/2003 | Kawasaki | 701/80 |
| 2004/0039523 A1 * | 2/2004 | Kainuma et al. | 701/208 |

OTHER PUBLICATIONS

Bae, Hong S.; Ryu, Jihan; Gerdes, J. Christian, "Road Grade and Vehicle Parameter Estimation for Longitudinal Control Using GPS", *2001 IEEE Intelligent Transportation Systems Conference Proceedings*–Oakland (CA). Aug. 25–29, 1991, pp. 168–173.

* cited by examiner

*Primary Examiner*—Olga Hernandez
(74) *Attorney, Agent, or Firm*—Jon D. Shutter; Frank J. Kozak; Lawrence M. Kaplan

(57) ABSTRACT

A method of obtaining data for a geographic database is disclosed. Data indicating a plurality of locations along roads including data indicating altitudes at the plurality of locations is provided. Road grade values for a plurality of subsections of the road are computed; each of the subsections is a portion of the road between two of the locations. A plurality of temporary change points are identified as joining two adjacent subsections having road grade values that differ by a value greater than a predetermined amount. Road grade values for each part of the road between adjacent temporary change points are computed. Consecutive parts of the road having road grade values that falls within a predetermined range are grouped into at least one constant road grade section. The geographic database stores data that define the constant road grade section.

19 Claims, 12 Drawing Sheets

METHOD AND SYSTEM FOR COMPUTING ROAD GRADE DATA

REFERENCE TO RELATED APPLICATION

The present application is related to the co-pending application entitled "METHOD AND SYSTEM FOR OBTAINING ROAD GRADE DATA" filed on the same date herewith, the entire disclosure of which is incorporated by reference herein.

BACKGROUND OF THE INVENTION

The present invention relates generally to geographic databases, and more particularly, the present invention relates to a method and system for computing road grade data using collected altitude or elevation data.

Geographic databases have various uses. Geographic databases are used in in-vehicle navigation systems, personal computers, networked computing environments, and various other kinds of platforms, as well as on the Internet. Geographic databases are used with various kinds of applications to provide various navigation-related and map-related functions including map display, route calculation, route guidance, truck fleet deployment, traffic control, traffic monitoring, electronic yellow pages, roadside assistance, emergency services, and so on.

In order to provide these kinds of functions, a geographic database includes data that represent geographic features in a region. The geographic features that are represented in a geographic database may include roads, intersections, and so on. A geographic database includes information about the represented geographic features, such as the geographic coordinates of roads in a geographic region, speed limits along the road segments, locations of stop lights, turn restrictions at intersections of roads, address ranges, street names, and so on.

Collecting information for a geographic database is a significant task. Not only is the initial collection of data a significant undertaking, but a geographic database needs to be updated on a regular basis. For example, new streets are constructed, street names change, traffic signals are installed, and turn restrictions are added to existing roads. Also, new levels of detail may be added about geographic features that are already represented in an existing geographic database. For example, an existing geographic database for roads may be enhanced with information about lane widths, shoulder sizes, traffic signs, lane barriers, address ranges, sidewalks, bicycles paths, etc. Thus, there exists a need to continue to collect information for a geographic database.

One type of information that is useful to include in a geographic database is road grade information. One way of measuring road grade is with a vehicle having a mechanical road grade sensor traveling the road. One shortcoming of the mechanical road grade sensors is that they may provide inaccurate road grade measurements when traveling over bumps or a rough road. Additionally, road grade may be derived with altitude at points along the road determined using surveying equipment. However, surveying equipment may require that the equipment be mounted in a stationary position and therefore is not useable in a moving vehicle.

Accordingly, it would be beneficial to collect and compute road grade information more inexpensively, efficiently and accurately.

SUMMARY OF THE INVENTION

To address these and other objectives, the present invention comprises a method for obtaining road grade data for a geographic database. Data indicating a plurality of locations along roads including data indicating altitude at the plurality of locations is provided. Road grade values for a plurality of subsections of the road are computed; each of the subsections is a portion of the road between two of the locations. A plurality of temporary change points are identified as joining two adjacent subsections having road grade values that differ by a value greater than a predetermined amount. A road grade value for each part of the road between adjacent temporary change points is computed. Consecutive parts of the road having road grade values that falls within a predetermined range are grouped into at least one constant road grade section. The geographic database stores data that define the constant road grade section.

DETAILED DESCRIPTION OF THE PRESENTLY PREFERRED EMBODIMENTS

I. Geographic Database

Figure 1:
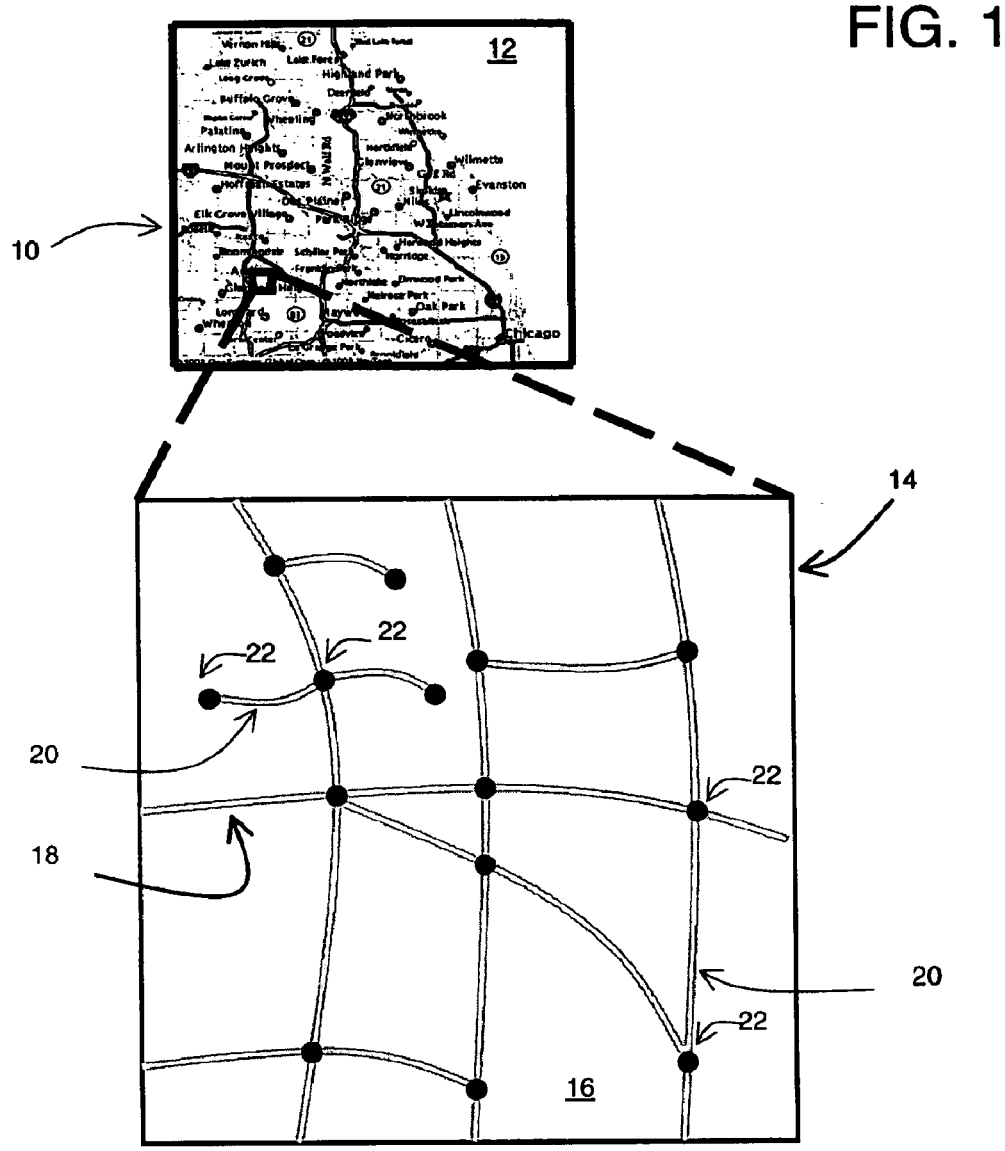
FIG. 1 shows a map of a geographic region.

FIG. 1 shows a map 10 of a geographic region 12. The geographic region 12 may correspond to a metropolitan or rural area, a state, a country, or combinations thereof, or any other area of comparable size. Located in the geographic region 12 are physical geographic features, such as roads, points of interest (including businesses, municipal facilities, etc.), lakes, rivers, railroads, municipalities, etc.

FIG. 1 also includes an enlarged map 14 of a portion 16 of the geographic region 12. The enlarged map 14 illustrates part of the road network 18 in the geographic region 12. The road network 18 includes, among other things, roads and intersections located in the geographic region 12. As shown in the portion 16, each road in the geographic region 12 is composed of one or more road segments 20. A road segment 20 represents a portion of the road. Each road segment 20 is shown to have associated with it two nodes 22; one node represents the point at one end of the road segment and the other node represents the point at the other end of the road segment. The node at either end of a road segment may correspond to a location at which the road meets another road, i.e., an intersection, or where the road dead-ends.

Figure 2:
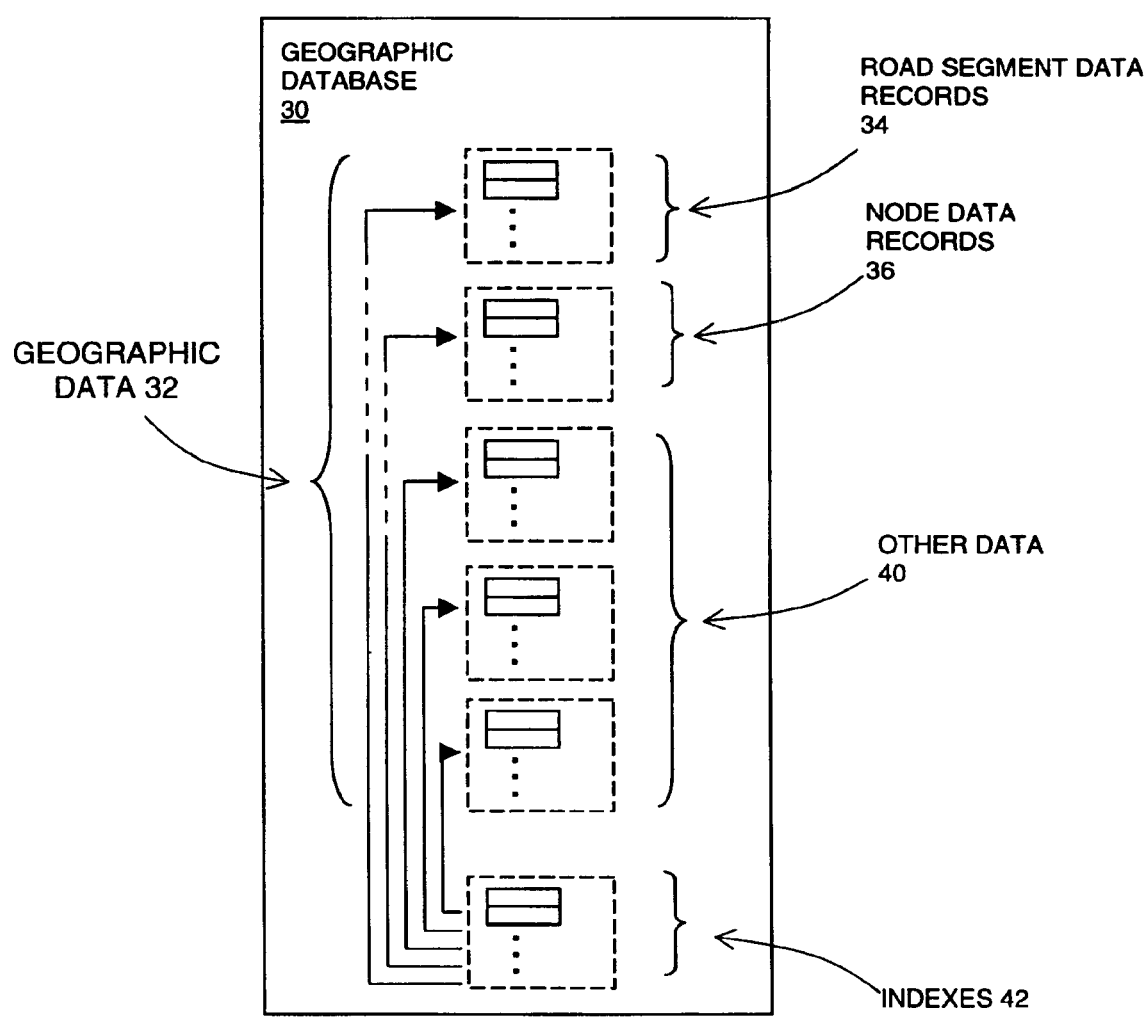
FIG. 2 is a block diagram of a geographic database that represents the geographic region of FIG. 1.

Referring to FIG. 2, a geographic database 30 contains data 32 that represents some of the physical geographic features in the geographic region (12 in FIG. 1). The data 32 contained in the geographic database 30 includes data that represent the road network 18. In the embodiment of FIG. 2, the geographic database 30 that represents the geographic region 12 contains at least one database record 34 (also referred to as "entity" or "entry") for each road segment 20 in the geographic region 12 in FIG. 1. The geographic database 30 that represents the geographic region 12 also includes a database record 36 (or "entity" or "entry") for each node 22 in the geographic region 12. (The terms "nodes" and "segments" represent only one terminology for describing these physical geographic features and other terminology for describing these features is intended to be encompassed within the scope of these concepts.)

The geographic database 30 may also include other kinds of data 40. The other kinds of data 40 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. The geographic database 30 also includes indexes 42. The indexes 42 may include various types of indexes that relate the different types of data to each other or that relate to other aspects of the data contained in the geographic database 30.

Figure 3:
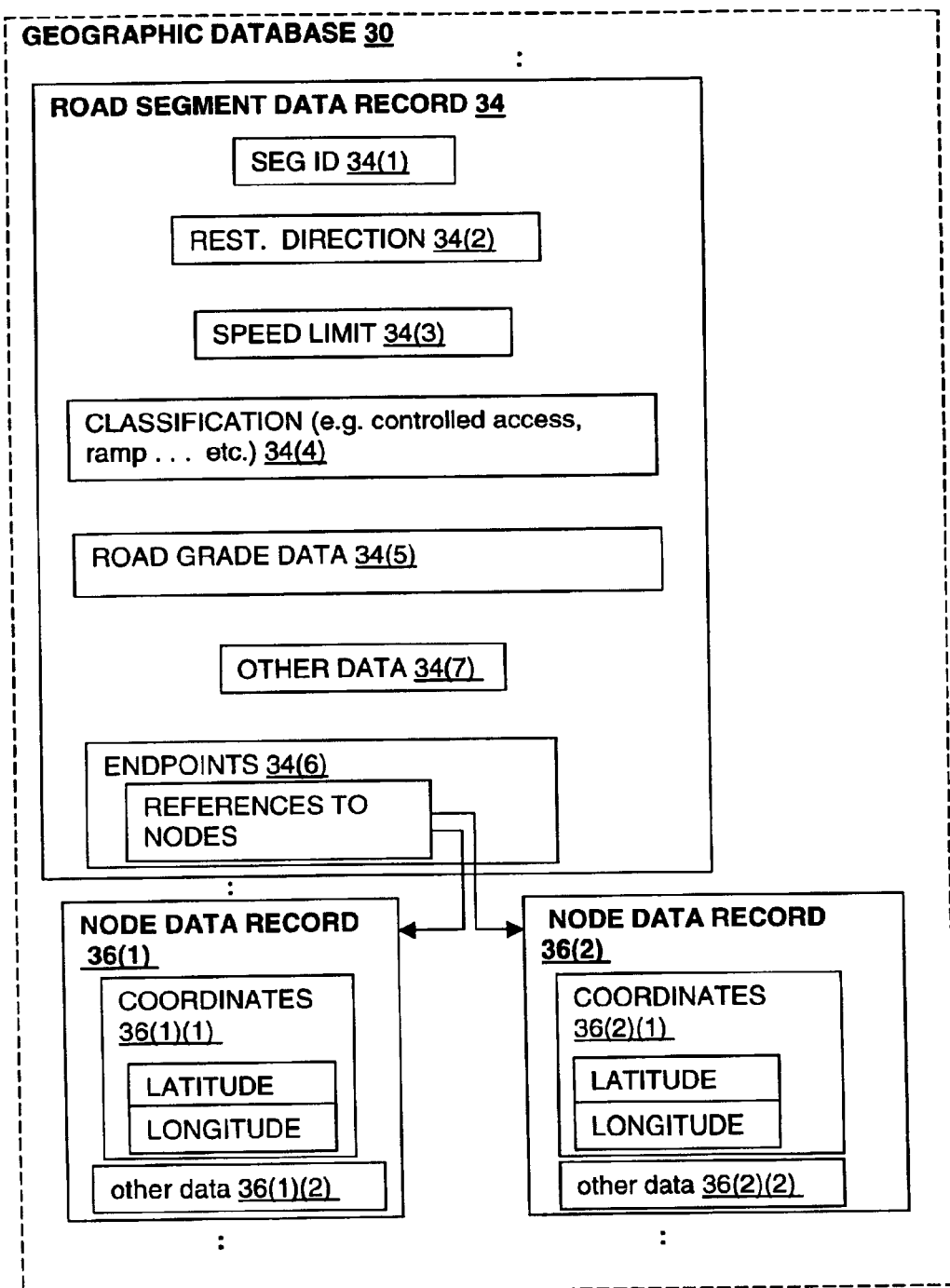
FIG. 3 is a block diagram showing a road segment data record contained in the geographic database of FIG. 2.

FIG. 3 shows some of the components of a road segment data record 34 contained in the geographic database 30. The road segment record 34 includes a segment ID 34(1) by which the data record can be identified in the geographic database 30. Each road segment data record 34 has associated with it information (such as "attributes", "fields", etc.) that describes features of the represented road segment. The road segment data record 34 may include data 34(2) that indicate the restrictions, if any, on the direction of vehicular travel permitted on the represented road segment. The road segment data record 34 includes data 34(3) that indicate a speed limit or speed category (i.e., the maximum permitted vehicular speed of travel) on the represented road segment. The road segment data record 34 may also include data 34(4) indicating whether the represented road segment is part of a controlled access road (such as an expressway), a ramp to a controlled access road, a bridge, a tunnel, a toll road, a ferry, and so on.

The road segment record 34 may also include road grade data 34(5) that indicate the grade of the road segment. In one embodiment, the road grade data 34(5) includes road grade change points and a corresponding percentage of grade change. Additionally, the road grade data 34(5) may include the corresponding percentage of grade change for both directions of a bi-directional road segment. The location of the road grade change point is represented as a position along the road segment, such as thirty feet from the end or node of the road segment. For example, the road segment may have an initial road grade associated with its beginning node. The road grade change point indicates the position on the road segment wherein the road grade or slope changes, and percentage of grade change indicates a percentage increase or decrease of the grade or slope. Each road segment may have several grade change points depending on the geometry of the road segment. In another embodiment, the road grade data 34(5) includes the road grade change points and an actual road grade value for the portion of the road segment after the road grade change point until the next road grade change point or end node. In a further embodiment, the road grade data 34(5) includes elevation data at the road grade change points and nodes.

The road segment data record 34 also includes data 34(6) providing the geographic coordinates (e.g., the latitude and longitude) of the endpoints of the represented road segment. In one embodiment, the data 34(6) are references to the node data records 36 that represent the nodes corresponding to the endpoints of the represented road segment. The road segment data record 34 may also include or be associated with other data 34(7) that refer to various other attributes of the represented road segment. The various attributes associated with a road segment may be included in a single road segment record, or may be included in more than one type of record which are cross-referenced to each other. For example, the road segment data record 34 may include data identifying what turn restrictions exist at each of the nodes which correspond to intersections at the ends of the road portion represented by the road segment, the name or names by which the represented road segment is known, the street address ranges along the represented road segment, and so on.

Each of the node data records 36 may have associated information (such as "attributes", "fields", etc.) that allows identification of the road segment(s) that connect to it and/or its geographic position (e.g., its latitude and longitude coordinates). For the embodiment shown in FIG. 3, the node data records 36(1) and 36(2) include the latitude and longitude coordinates 36(1)(1) and 36(2)(1) for their node. The node data records 36(1) and 36(2) also include other data 36(1)(2) and 36(2)(2) for their node.

The data records 34 in the geographic database 30 that represent roads may not necessarily include all the same types of data attributes. One reason for this is that roads do not all have the same properties. For example, some roads have a highway designation (e.g., "Wisconsin State Highway 120") whereas other roads do not. Another reason why data records in the geographic database 30 that represent roads may not have the same data attributes is that some of the properties of a road may not have been collected or confirmed.

Road grade data may be collected using the data collection system as described below. In one embodiment, road grade data are obtained for all the roads represented in the geographic database. In another embodiment, road grade data are included for only some of the roads represented in the geographic database. According to this latter embodiment, some of the roads are represented by data records that do not include road grade data.

II. System for Obtaining Road Grade Data

A. Data Collection System

Figure 4:
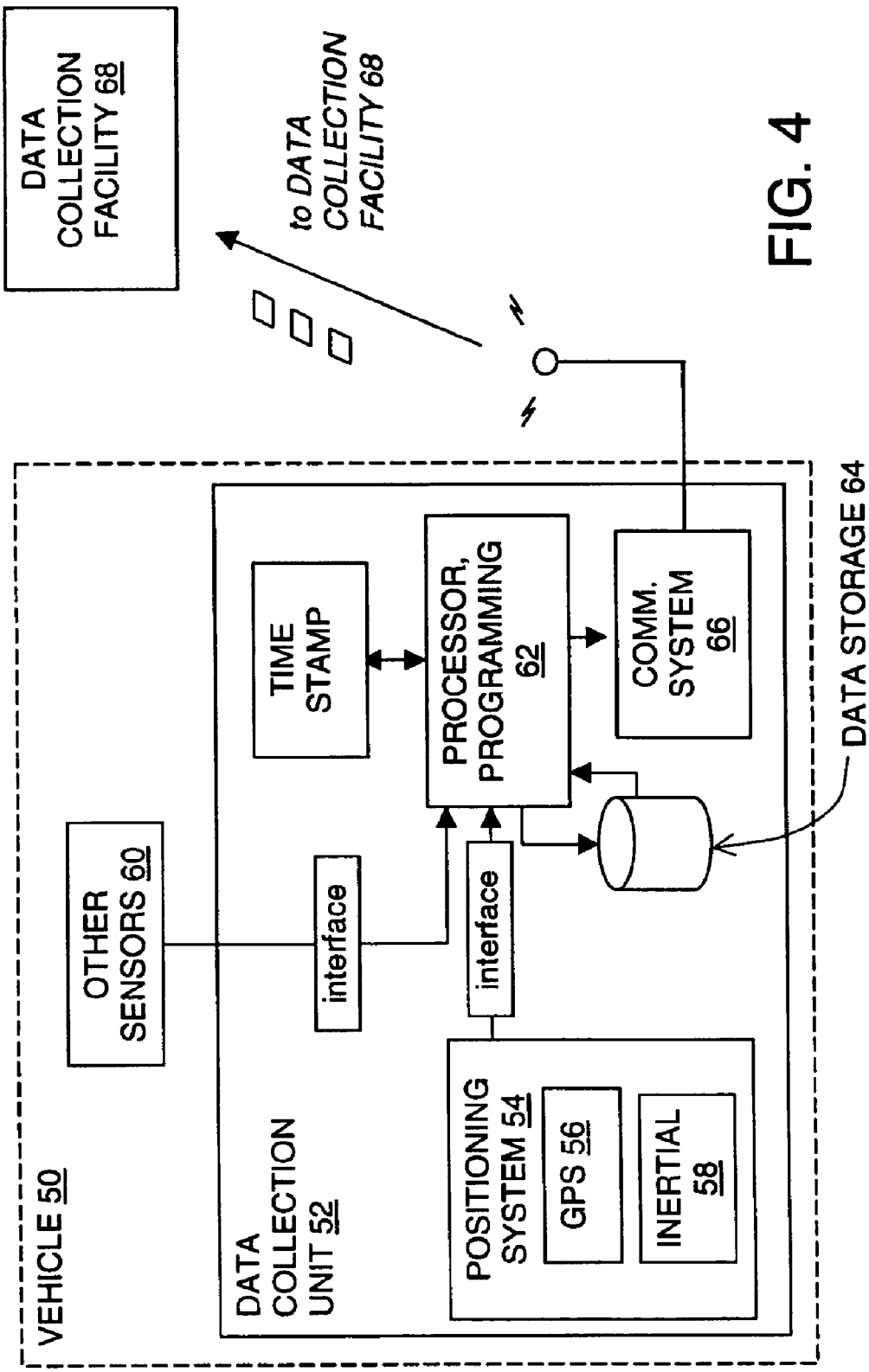
FIG. 4 is a block diagram illustrating a vehicle equipped for data collection.

FIG. 4 shows a vehicle 50 equipped with a data collection unit 52. The vehicle 50 may be a data collection vehicle operated by a geographic database developer. The data collection vehicle is operated specifically for data collection purposes. The geographic database developer determines the routes traveled by the vehicle in order to collect specific data. Alternatively, the vehicle 50 is operated as a probe vehicle. A probe vehicle is a vehicle that collects road-related data while it is being used for purposes unrelated to the collection of road-related data. For example, a probe vehicle is operated for ordinary, everyday purposes, such as commuting, leisure or business. A member of the public may operate the probe vehicle, or alternatively, a commercial enterprise or government entity may operate the probe vehicle. While the probe vehicle is being used for a purpose unrelated to the collection of road-related data, the data collection unit 52 in the vehicle 50 operates to collect road-related data.

The data collection unit 52 is a combination of hardware and software components. The data collection unit 52 includes a positioning system 54. The positioning system 54 includes a GPS 56. The positioning system 54 may also include inertial sensors 58. The positioning system 54 enables the position of the data collection unit 52 (and thus the vehicle 50 in which it is located) to be determined. The positioning system 54 provides a coordinate triple of latitude, longitude, and altitude. In one embodiment, the GPS 56 has an accuracy of approximately 3 meters for latitude and longitude; however, the GPS 56 may have any other accuracy, such as accuracy ranging from 2 centimeters to 20 meters for latitude and longitude. The uncertainty in GPS generated altitude is significantly worse than for latitude and longitude. The data collection unit 52 also includes other sensors 60, such as a speed sensor indicating the current speed of the vehicle 50, an odometer indicating distance traveled, a sensor that indicates heading or bearing of the vehicle or any other sensor. In another embodiment, the positioning system 54 may include one sensor to provide latitude and longitude position and another separate sensor to provide altitude.

The data collection unit 52 also includes the necessary hardware and software (processor and programming 62) to receive data from the positioning system 54 and other sensors 60. The data collection unit 52 includes the appropriate interfaces to allow the processor and programming 62 to receive data from the positioning system 54 and the other sensors 60. The processor and programming 62 in the data collection unit 52 are suitable for selecting or receiving the position data from the positioning system 54 at appropriate time periods, such as every second. Additionally, the processor and programming 62 select or receive data from the other sensors 60 at corresponding times. The processor and programming 62 relate the data received from the positioning system and the other sensors 60 to each other. Furthermore, the processor and programming may associate the data received from the positioning system 54 and the other sensors with a time stamp or any other information.

The data collection unit 52 includes a data storage device 64. The processor and programming 62 in the data collection unit 52 provide for storing some or all the data from the positioning system 54 and the other sensors 60 on the data storage device 64. The data storage device 64 is a non-volatile data storage unit, such as a hard drive or a memory card.

In one embodiment, the data collection unit 52 may receive data from a vehicle navigation system or may be part of the navigation system. There are various kinds of navigation systems installed in vehicles. Some navigation systems use vehicle data in connection with providing certain navigation-related functions. As an example, some vehicle navigation systems use the vehicle speed or wheel speed in conjunction with other devices, such as a gyroscope or GPS, to help determine the position of the vehicle. The data collection unit 52 may receive position and speed data from the navigation system. Alternatively, the navigation system may perform the functions of the data collection unit 52 and may include an additional processor and programming to collect data.

The data collection unit 52 may include a communications system 66. The communications system 66 provides for sending some or all the data from the positioning system 54 and the other sensors 60 to a remotely located data collection facility 68. In the embodiment of FIG. 4, the communications system 66 provides for wireless transmission of the data from the data collection unit 52 to the remotely located data collection facility 68. In the embodiment of FIG. 4, the data sent from the data collection unit 52 are stored temporarily on the data storage device 64 before being transmitted to the data collection facility 68. Various processes may be performed on the data before they are sent to the remotely located data collection facility 68. For example, the data may be compressed, filtered, normalized, etc. These processes may be performed to reduce the amount of data that need to be sent from the data collection unit 52 to the data collection facility 68.

In one alternative, the data collected by the data collection unit 52 are sent every several seconds or minutes to the data collection facility 68 after being temporarily stored on the data storage device 64 in the data collection unit 52. In another alternative embodiment, the data collected by the data collection unit 52 are sent directly to the data collection facility 68 without being temporarily stored on a data storage device in the data collection unit 52. In another alternative embodiment, the data collected by the data collection unit 52 are stored in the vehicle for a relatively long period of time, e.g., several days or weeks. The data are then sent to the data collection facility 68. The data may be sent wirelessly via a communications system or alternatively, the data may be sent by other means. For example, the data may be transmitted over land-based telephone lines or the Internet. In another embodiment, the data storage medium upon which the data are stored is physically sent to the data collection facility 68 (e.g., by mail). At the data collection facility 68, further processing of the data takes place as described below.

B. Data Collection Facility

Figure 5:
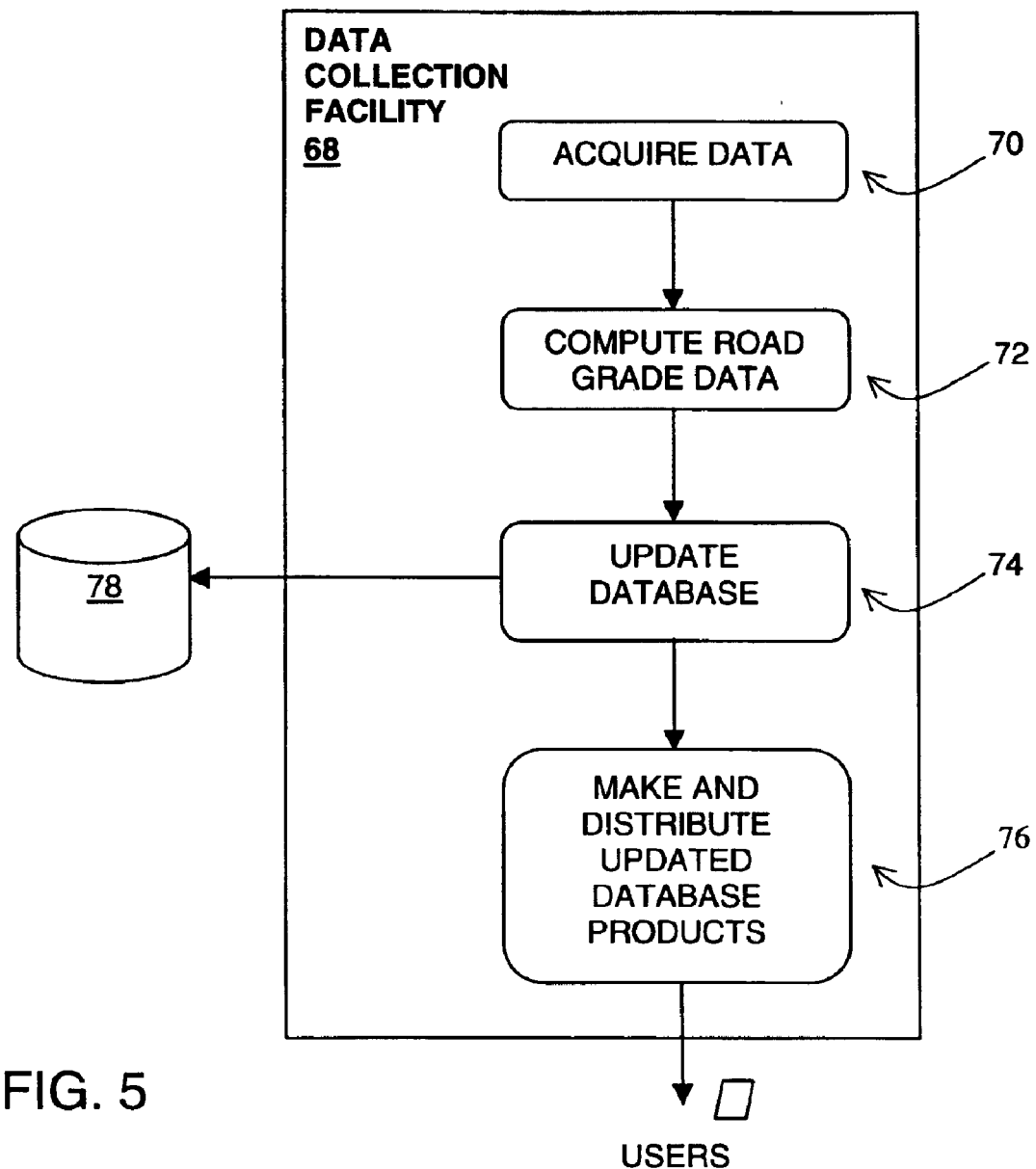
FIG. 5 is a flow chart of the operations of a data collection facility.

According to one embodiment, the data collection facility 68 obtains position data, including altitude data, computes road grade information and updates the geographic database following the steps shown in FIG. 5. The data collection facility 68 includes necessary hardware and software (processor and programming) to carry out the steps of FIG. 5. The data collection facility 68 receives the data from the vehicle 50 at step 70. The data collection facility 68 obtains the data from the data collection vehicle that is operated by the geographic database developer. Alternatively, the data collection facility 68 may obtain the data from numerous probe vehicles. The data collection facility 68 may obtain the data from the vehicle(s) 50 by wireless data transmission or by other means (e.g., sending a diskette or via modem).

The data collection facility 68 processes the data received from the vehicle 50 and computes road grade data at step 72. The methods for computing road grade data will be described in detail below in conjunction with FIGS. 6 through 12.

Referring to FIG. 5, after the computing of step 72, the road grade data are stored in a master copy 78 of the geographic database at step 74. The road grade data may be stored as an attribute to the road segment data record 34. The road grade data that are stored in the master copy 78 of the geographic database may be used to update existing data or to add new data. For example, the master copy 78 of the database may already include road grade data for a particular represented road segment. The new road grade data obtained by using the process described in FIG. 5 can be used to update the existing data, e.g., confirm the existing data or make the existing data more accurate. Alternatively, the master copy 78 of the geographic database may not include road grade data for a particular road segment. If new road grade data are obtained for a road segment, the new road grade data can be added as a new attribute of the data record.

In one embodiment, prior to updating existing data or adding new data to the master copy of the geographic database with the road grade data, the existence and position of some the identified road grade information is confirmed by direct observation of field personnel.

The geographic database with new or improved road grade data and other data can be used to make derived database products at step 76. The derived database products may include only portions of all the data in the master version 78 of the database. For example, the derived database products may include data that relate to only one or more specific regions. The derived database products may be used on various kinds of computing platforms. For example, the derived database products may be used in navigation systems (such as in-vehicle navigation systems and hand-held portable navigation systems), personal computers (including desktop and notebook computers), and other kinds of devices (such as PalmPilot®-type devices, pagers, telephones, personal digital assistants, and so on). Derived database products may also be used on networked computing platforms and environments, including the Internet. The derived database products may be in a different format than the format in which the master copy of the database is maintained. The derived database products may be in a format that facilitates the uses of the derived products in the platforms in which they are installed. The derived database products may also be stored in a compressed format on the media on which they are located.

In an alternative embodiment, the data collection unit 52 of FIG. 4 may perform some of the steps of the data collection facility 68. In this embodiment, rather than sending the position data, including altitude data, to the data collection facility 68, the processor and programming 62 of the data collection unit 52 performs the analysis on the data to obtain the road grade information. The data collection unit 52 then stores the road grade data in a storage medium.

III. Method for Computing Road Grade Data

Figure 6:
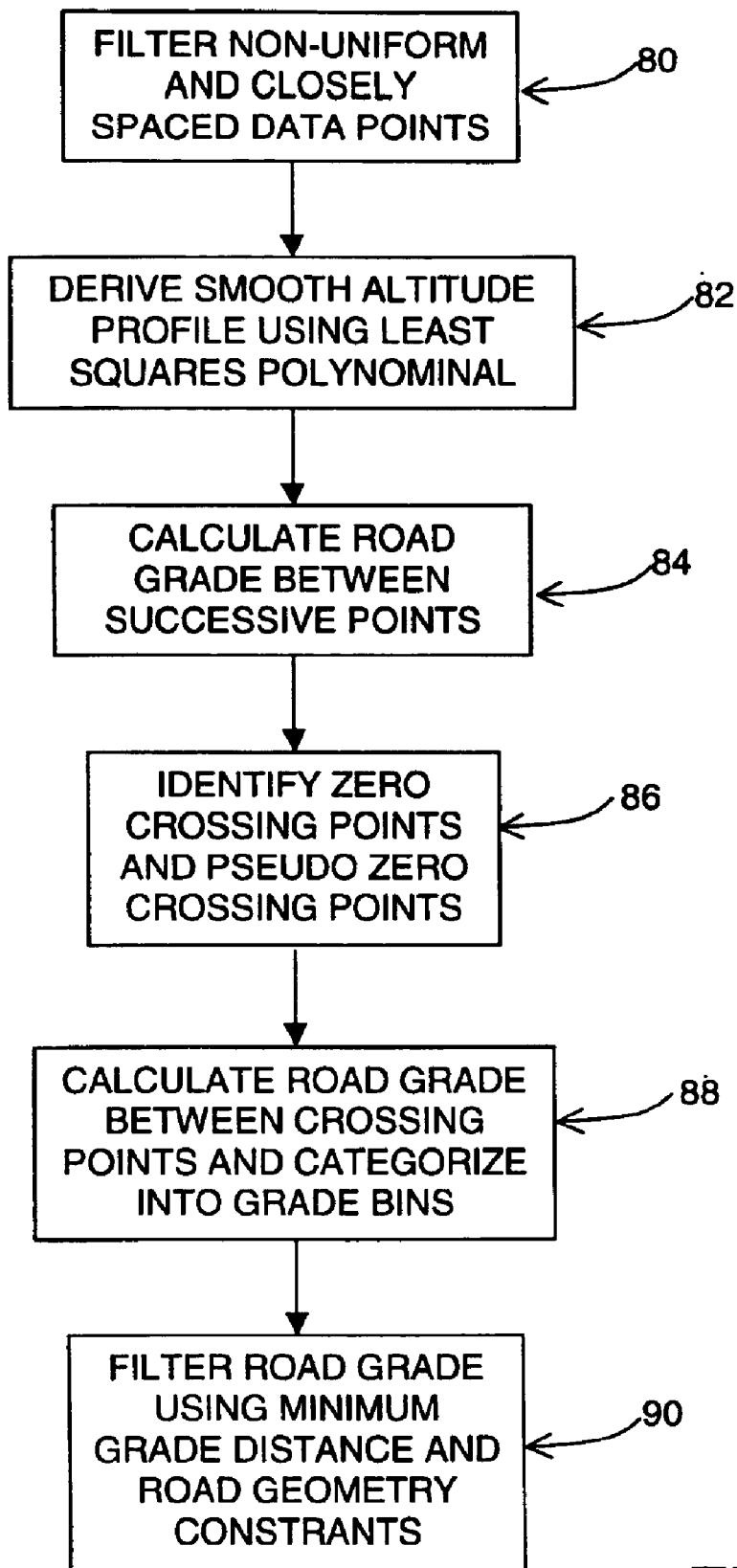
FIG. 6 is a flow chart of the operations of the data collection facility for analyzing data to obtain road grade data.

FIG. 6 illustrates one embodiment of the steps performed by the data collection facility 68 to compute road grade data of step 76 in FIG. 5. Because the positioning system 54 used to collect the altitude and latitude/longitude data may have accuracy limitations, the road grade determination may be complicated by an uneven distribution of data points (coordinate triple of latitude, longitude and altitude) and the presence of errors in the altitude and latitude/longitude data. The uneven distribution of data and errors in the position data may suggest that the road grade zigzags between inclines and declines instead of the gradual road grade changes present in typical road geometry. To reduce the effect of the errors in the altitude and latitude/longitude data and the uneven distribution of data points, the data collection facility 68 filters the data. At step 80, the data collection facility 68 filters the data to remove non-uniform and closely spaced data points. When the vehicle 50 is stopped or moving at slow speeds provides a large number of closely spaced data points. Due to the accuracy of the positioning system, the closely spaced data points may provide an inaccurate representation of a true altitude profile of the road.

Figure 7:
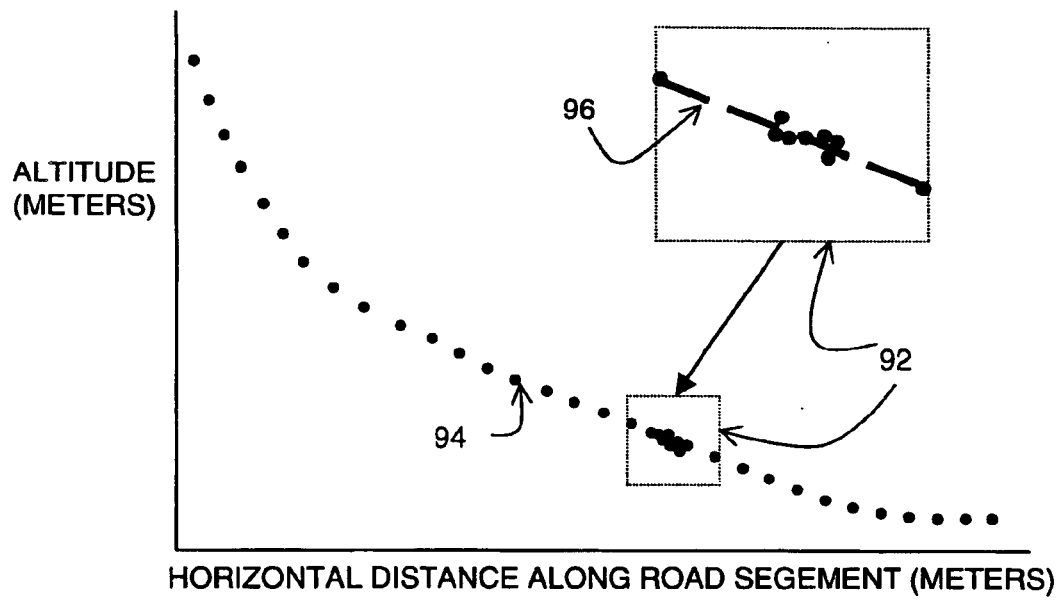
FIG. 7 is a graph of altitude data points.

FIG. 7 illustrates an altitude profile of altitude data versus horizontal distance along the road as collected by the vehicle 50 traveling along the road. Horizontal distance is the accumulated distance between latitude/longitude positions of consecutive data points along the road segment. Referring to FIG. 7, box 92 illustrates a cluster of closely spaced data points 94. In one embodiment, the data collection facility 68 eliminates the cluster of closely spaced data points 94. In another embodiment, the data collection facility 68 replaces cluster of closely spaced points with a linear representation, such as the dashed line 96 in FIG. 7.

Figure 8:
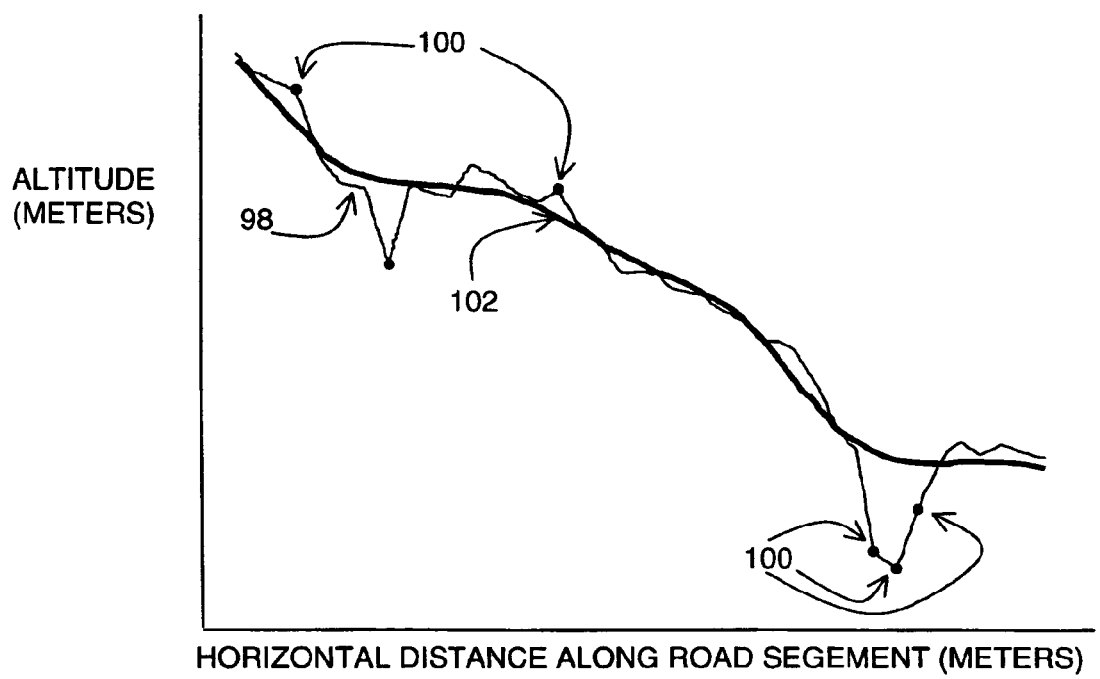
FIG. 8 is a graph of smooth altitude profile.

After eliminating the closely spaced data points, the data collection facility 68 derives a smooth altitude profile of the road segment at step 82 of FIG. 6. Even after eliminating closely spaced data points, the data points may provide an uneven altitude profile 98 as shown in FIG. 8. Since roads by design are smooth surfaces with gradual altitude changes, the data collection facility 68 derives the smooth altitude profile to reduce such unrealistic profile 98. In one embodiment, the data collection facility 68 uses a least squares polynomial algorithm to derive the smooth altitude profile; however, other smoothing or curve fitting algorithms may also be used.

In one embodiment, the data collection facility 68 derives the smooth altitude profile using a least squares polynomial with (2n+1) successive altitude data points. In the least squares polynomial implementation, a fourth order polynomial uses successive altitude data points to determine the coefficients of the polynomial (Equation 1).

$$\begin{bmatrix} \Delta h_1 \\ \Delta h_2 \\ \vdots \\ \vdots \\ \Delta h_{2n+1} \end{bmatrix}_{(2n+1)\times 1} = \begin{bmatrix} 1 & d_1 & d_1^2 & d_1^3 & d_1^4 \\ 1 & d_2 & d_2^2 & d_2^3 & d_2^4 \\ \vdots & \vdots & \vdots & \vdots & \vdots \\ \vdots & \vdots & \vdots & \vdots & \vdots \\ 1 & d_{2n+1} & d_{2n+1}^2 & d_{2n+1}^3 & d_{2n+1}^4 \end{bmatrix}_{(2n+1)\times 5} \begin{bmatrix} a_0 \\ a_1 \\ a_2 \\ a_3 \\ a_4 \end{bmatrix} \quad (1)$$

As shown in the Equation 1, the independent variable is the horizontal distance (d) from the first to each of the following latitude/longitude points and the dependent variable is their corresponding altitude difference ($\Delta h$). In Equation 1, the coefficients of the polynomial are represented by variable a. Equation 2 represents Equation 1 in matrix notation:

$$y = Ax \quad (2)$$

Where, $x = [a_0 \ a_1 \ a_2 \ a_3 \ a_4]^T$ (T is symbol for transposed matrix).

Using least squares principle for the (2n+1) equations, the five parameters (polynomial coefficients) are optimally determined by matrix methods (linear algebra) such as the pseudo inverse or from the normal equation (Equation 3).

$$x = (A^T A)^{-1} A^T y \quad (3)$$

Once these parameters are determined, new value for the altitude of the middle (n+1$^{th}$) point is obtained from Equation 4. Altitude difference (original altitude—new altitude) for each point is also derived (Equation 5).

$$\hat{h}_n = \hat{h}_1 + a_0 + a_1 d_n + a_1 d_n^2 + a_1 d_n^3 + a_1 d_n^4 \quad (4)$$

$$\Delta h_n = h_n - \hat{h}_n \quad (5)$$

Once new altitude and altitude difference for a point are obtained, the (2n+1) window is shifted one point forward and the process is repeated until the end of the profile. Once this process is complete, variance ($\sigma^2$) of the altitude difference is calculated using Equations 6 and 7.

$$\Delta \bar{h} = \frac{\sum \Delta h_i}{n} \quad (6)$$

$$\sigma_h^2 = \frac{\sum (\Delta h_i - \Delta \bar{h})^2}{n-1} \quad (7)$$

Large variance values obtained from Equation 7 indicate points having larger altitude errors. If the variance value is larger than a chosen threshold, such as one or two standard deviations (standard deviation is square root of variance), an outlier point is identified. FIG. 8 illustrates some outlier points 100.

The least squares polynomial process is then repeated to re-estimate the altitudes excluding the identified outlier data points 100. The removal of outlier data points 100 ensures that incorrect altitude data will not influence the final smooth altitude profile. In one embodiment, the smoothing process is also repeated in reverse order to get a second value of altitude for the each point. A mean altitude value calculated from the forward and reverse calculated altitude values further reduces the least square polynomial estimation errors. In one embodiment, the above process is run iteratively until a significantly smooth altitude profile is obtained. FIG. 8 illustrates the smooth altitude profile 102 provided by the least squares polynomial process.

In one embodiment, after deriving the smooth altitude profile, the data collection facility 68 calculates road grade values between successive data points (sub-segments of the road segment) at step 84 of FIG. 8. The road grade values for each of the sub-segments is calculated as the change in altitude divided by the change in horizontal distance between the two successive data points. Road grade is typically expressed in percentage, so the previously calculated change in altitude divided by change in horizontal distance is converted into a percentage. The change in altitude is calculated using the smoothed altitude data associated with each data point, and the change in horizontal distance is calculated using the latitude/longitude data associated with each data point.

Figure 9:
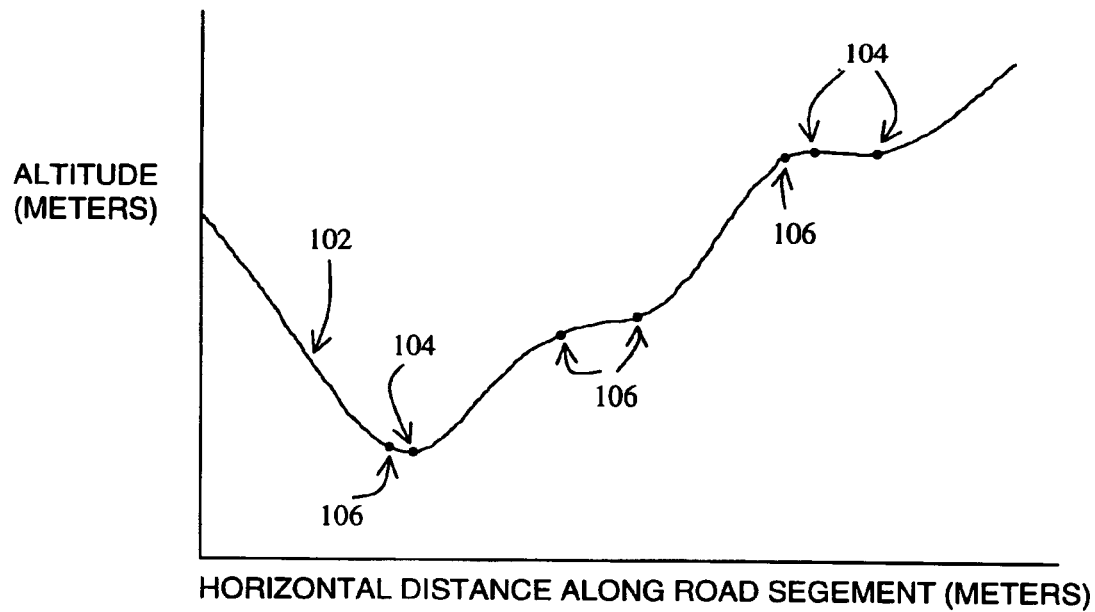
FIG. 9 is a graph of smooth altitude profile with grade change points.

Once the road grade values for each sub-segment are calculated, the data collection facility 68 groups together a number of adjoining sub-segments with grades values within a selected range and categorizes these adjoining sub-segments into a section of constant road grade. According to one embodiment, the data collection facility 68 derives the sections of constant road grade following steps 86, 88 and 90 of FIG. 6. At step 86, the data collection facility 68 identifies zero-crossing points and pseudo zero crossing points in the smooth altitude profile 102. Zero-crossing points correspond with data points that join successive sub-segments whose road grade values change from positive to negative or vice-versa. Zero-crossing points are critical locations of peaks and valleys on the road segment corresponding to road grade changes. Moving along the road segment and comparing the road grade value of one of the sub-segments to the road grade value of the next sub-segment identifies the location of zero-crossing points as the data point corresponding with the grade values changing from negative to positive or vise-versa. FIG. 9 illustrates zero-crossing points 104 on the smooth altitude profile 102.

Zero-crossing points may not include all locations on the road where road grade changes because significant road grade changes also occur between consecutive zero crossing points. For example, the road may change from a highly steep road grade to a significantly less steep road grade. In one embodiment, to find locations corresponding to road grade changes between the identified zero-crossing points, the data collection facility 68 implements a rotational transformation. The rotational transformation rotates the original altitude profile between two consecutive zero-crossing points by a chosen angle. The rotation generates a pseudo profile with the zero-crossing points turned to non-zero-crossing points and any points where the slope changes significantly are false zero-crossing points. These false zero-crossing points obtained with the rotation are called pseudo zero-crossing points.

The process for detecting pseudo zero-crossing points first calculates the altitude difference ($\Delta h$) and the distance difference (D) to all the points from the first zero-crossing point to the second zero-crossing points with Equations 8 and 9 wherein ($E_k$–$E_1$) represent displacement in easting and ($N_k$–$N_1$) represent displacement in northing from point 1 to point k. A slope angle ($\theta$) for the stretch between the two zero-crossing points is then obtained using Equation 10. A fraction of this angle (multiplied by the fractional constant k), for example k equals one half, is used to determine a rotation matrix R with Equation 11.

$$\Delta h_k = h_k - h_1 \quad (8)$$

$$D_k = \sqrt{(E_k-E_1)^2 + (N_k-N_1)^2} \quad (9)$$

$$\theta = \tan \frac{\Delta h_N}{D_N} \quad (10)$$

$$R = \begin{bmatrix} \cos k\theta & \sin k\theta \\ -\sin k\theta & \cos k\theta \end{bmatrix} \quad (11)$$

$$\begin{bmatrix} \hat{h}_k \\ \hat{D}_k \end{bmatrix} = \begin{bmatrix} h_1 \\ D_1 \end{bmatrix} + R \begin{bmatrix} \Delta h_k \\ D_k \end{bmatrix} \quad (12)$$

Using the rotation matrix with the calculated altitude and distance differences, pseudo-altitudes for all the points between the two zero-crossing points are calculated with Equation 12. Using the pseudo altitude profile provided with pseudo-altitude calculation, pseudo zero-crossing points are identified as data points that join successive sub-segments whose road grade values change from positive to negative or vice-versa. FIG. 9 illustrates pseudo zero-crossing points 106 on the smooth altitude profile 102.

In an alternative embodiment, rather than identifying the zero-crossing points and pseudo zero-crossing points to identify locations on the road where road grade changes significantly in the manner described above, the data collection facility 68 uses another method to identify any data points that join successive sub-segments whose road grade values differ by more than a predetermined amount as a location on the road where the road grade significantly changes.

The identified zero-crossing points and pseudo zero-crossing points provide points identifying locations on the road where the road grade significantly changes. In one embodiment, the data collection facility 68 performs additional processing on the identified grade change points to remove unnecessary grade change points due to residual inaccuracy in the altitude and the latitude/longitude data. At step 88 of FIG. 6, the data collection facility 68 calculates the road grade value between grade change points and categorizes the sections between grade crossing points into grade bins. The grade bins represent a range of road grade values. Table 1 illustrates one example of the grade bins and their respective road grade value ranges; other ranges of grade values are also possible.

TABLE 1

| Grade Bin | Grade Range | Grade Bin | Grade Range |
|---|---|---|---|
| 1 | grade < −15 | 10 | 1 <= grade < 3 |
| 2 | −15 <= grade <− 13 | 11 | 3 <= grade < 5 |
| 3 | −13 <= grade <− 11 | 12 | 5 <= grade < 7 |
| 4 | −11 <= grade <− 9 | 13 | 7 <= grade < 9 |
| 5 | −9 <= grade <− 7 | 14 | 9 <= grade < 11 |
| 6 | −7 <= grade <− 5 | 15 | 11 <= grade < 13 |
| 7 | −5 <= grade <− 3 | 16 | 13 <= grade < 15 |
| 8 | −3 <= grade <− 1 | 17 | grade > = 15 |
| 9 | −1 <= grade < 1 | | |

Moving along the road segment, the data collection facility 68 calculates the road grade value from the first grade change point to the second grade change point and the road grade value from the first grade change point to the third grade change point. If the two calculated road grade values fall into the same grade bin, the section from the first to the third grade change point forms one section of constant road grade, and the second grade change point is eliminated. The process continues forward to the fourth grade change point with the road grade value from the first to the fourth grade change point being compared to the grade value from the first to the third grade change point. If the two calculated road grade values fall within the same grade bin, the process eliminates the third grade change point and continues forward to the next grade change point. However, if the two road grade values do not belong to the same grade bin, the process retains the third grade change point, and the section of constant road grade extends from the first to the third road grade change point. The above procedure repeats from the third grade change point forward to the next grade change point to identify the next section of constant road grade. The process proceeds until reaching the forward most grade change point on the road segment. In addition to removing unnecessary grade change points, the data collection facility 68 identifies and adds locations for additional grade change points when the road grade value of one section differs greatly from the road grade value of the adjacent section, such as one falls within grade bin 3 and the other falls within grade bin 8.

Residual inaccuracies in the collected data may lead to significant road grade value changes for short sections of the road segment than actually present on the road segment. Because roads are designed with certain constraints to allow safe driving, large road grade value changes unlikely occur within short sections of the road segment. Therefore, the data collection facility 68 filters the sections of constant road grade using a minimum grade distance for road grade changes and merges short identified sections of constant road grade at step 90 of FIG. 6. The minimum grade distance may be based on road design criteria, truck length, type of terrain, etc. The data collection facility 68 compares the road length of identified sections of constant road grade to the minimum grade distance. If any of the identified sections of constant road grade are shorter than the minimum grade distance, the short section is merged with either the preceding or following adjoining section having the most compatible road grade value. When all of the short sections are merged, the remaining grade change points closely model the actual road geometry.

Also at step 90 of FIG. 6, the data collection facility 68 identifies any abnormal road grade values between the remaining grade change points. Typically, road geometry design allows a restricted range of road grade values for different types of roads and/or terrain. If any of the road grade values between the grade change points do not fall within the range of values based on road geometry design, such sections are merged with the adjacent section having the closest road grade value and the grade change point between the sections is eliminated. This process is repeated until all grades are within admissible range. In one embodiment, the admissible range for road grade values is between negative and positive ten percent. In another embodiment, the admissible range for road grade values may vary depending on the landscape and information regarding road construction. In an alternative embodiment, the abnormal grade values can be reported for human interpretation and/or field inspection.

Figure 10:
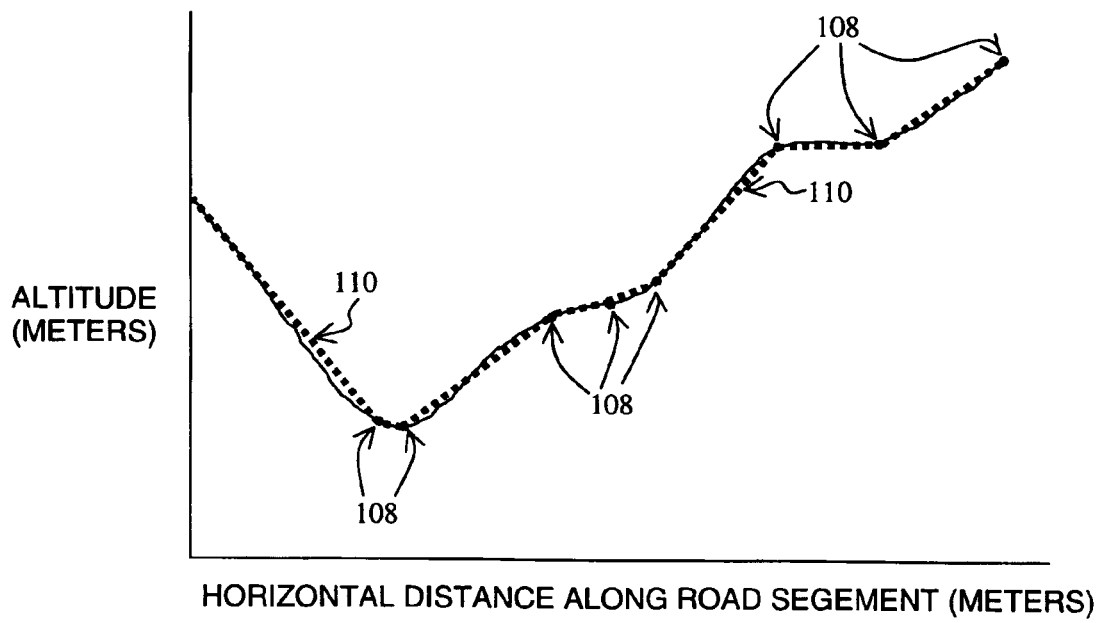
FIG. 10 is a graph of smooth altitude profile with sections of constant road grade.

FIG. 10 illustrates the identified grade change points 108 and sections of constant road grade 110 for a road segment as determined by the above method. The location of the grade change points 108 and the road grade values corresponding to the sections of constant road grade 110 may be included as the road grade data 34(5) of the road segment data record 34 as shown in FIG. 3. Additionally, the direction of the road grade may be determined for inclusion with the road grade data. The direction of road grade for the sections of constant road grade may be determined by comparing the altitude value associated with the road grade change points that define the section of constant road grade. For example, if one grade change point has a corresponding altitude value greater than the altitude value of the next grade change point indicates an incline, if one grade change point has a corresponding altitude value less than the altitude value of the next grade change point indicates a decline, and if one grade change point has a corresponding altitude value equal to the altitude value of the next grade change point indicates a flat section. Additionally, once road grade values have been determined for each of the sections of constant road grades, percentage change of grade from one section of constant road grade to an adjacent section of constant road grade may be calculated.

Although the above description of computing the road grade data has been utilizing altitude data collected with the positioning system 54, the above method may also be applied to other collected data. For example, the method may determine road grade data using altitude data collected with a barometer as described in the co-pending application entitled "METHOD AND SYSTEM FOR OBTAINING ROAD GRADE DATA" filed on the same date herewith, the entire disclosure of which is incorporated by reference herein. Additionally, the method may determine road grade data using height data from digital elevation model, pitch from a gyroscope, height difference from a double GPS antenna, and forward and vertical (delta) velocity from accelerometers or GPS.

IV. Alternatives

A. Hough Transform

In an alternative embodiment, the data collection facility 68 implements a Hough Transform on the altitude and latitude/longitude data points to identify the road grade data. The Hough Transform is a known technique for detecting straight lines or simple curves (such as circular arcs) within an image. (It can also be extended to other shapes, to some extent). The Hough Transform is described in U.S. Pat. No. 3,069,654.

Figure 11:
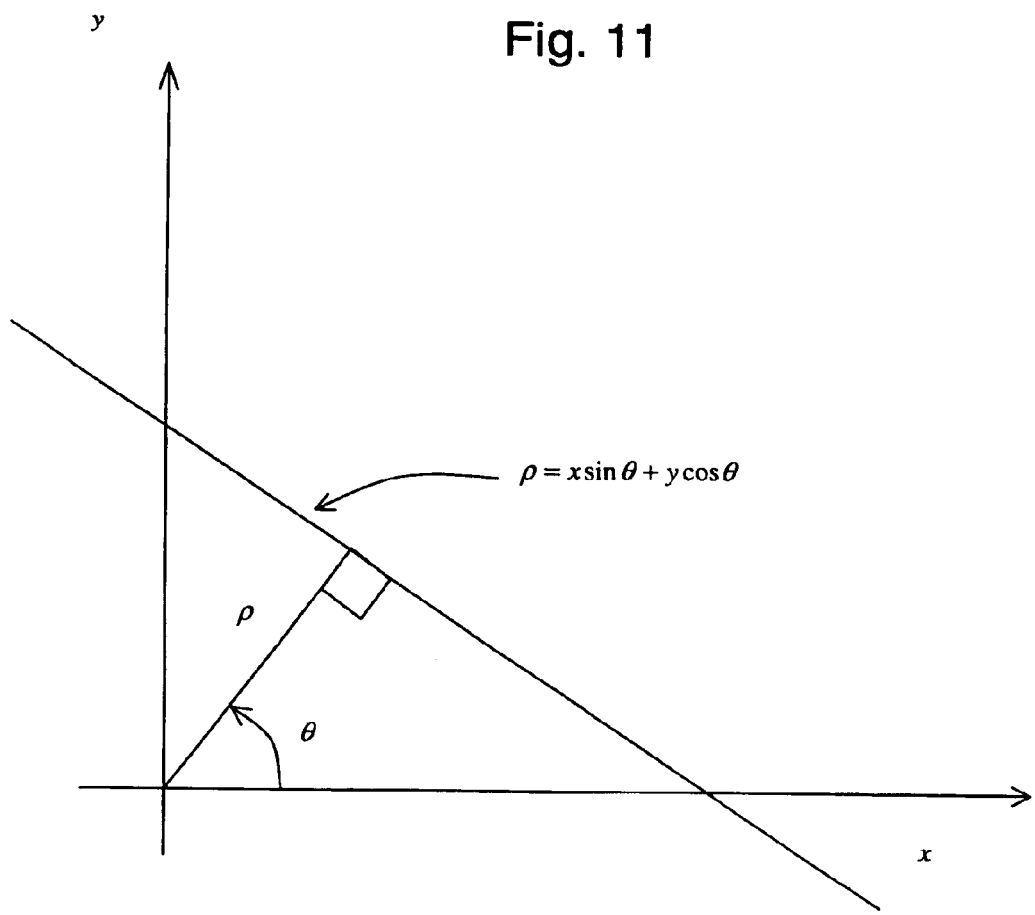
FIG. 11 is a graph that illustrates the Line Hough Transform.
Figure 12A:
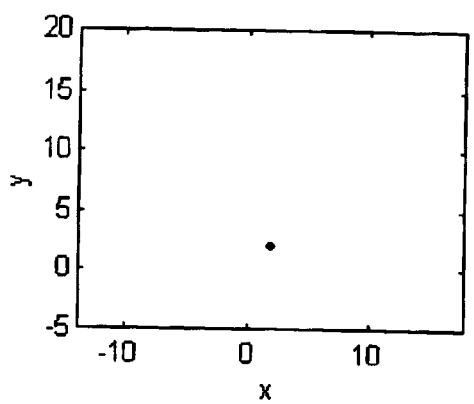
FIGS. 12A–12D are more graphs that illustrate the Line Hough Transform.
Figure 12B:
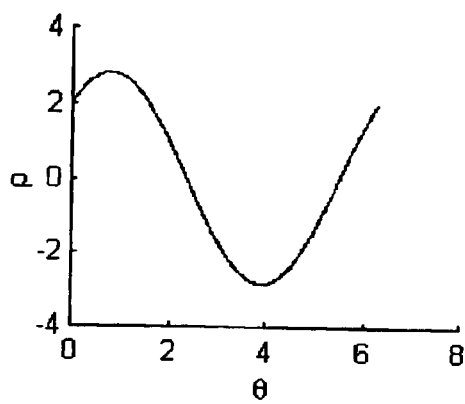
Figure 12C:
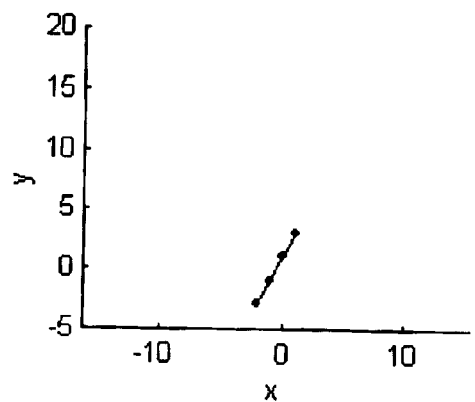
Figure 12D:
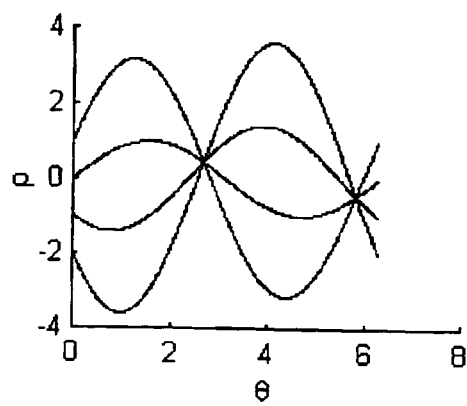

In the case of line detection, the Hough Transform will find all parameter pairs (m,c) that describe each line segment y=mx+c occurring in the image, where m is slope and c is the y-intercept. Note that for any point (x,y) in the x–y plane, an infinite number of lines can be drawn through that point, each with a different slope and y-intercept as shown in FIG. 11.

The equation of any one of these lines is $$y = mx + c \tag{1}$$

However, since m and c can take on a value of ±∞, it is more convenient to write the equation of the line in parametric form as follows:

$$\rho = x \cos \theta + y \sin \theta \tag{2}$$

where θ is the angle made with the x-axis by the normal through the origin to the line and ρ is the length of the normal, as shown in FIGS. 12A, 12B, 12C and 12D. The relationship between (ρ,θ) and (m,c) is given below:

$$\theta = \frac{\pi}{2} - \tan^{-1}(m) \tag{3}$$

$$\rho = \frac{c}{\sqrt{m^2 + 1}} \tag{4}$$

Each parameter pair (ρ,θ) defines a unique line in the x–y plane. Each point in the x–y plane maps to a sinusoid in the ρ–θ plane, i.e., if we plot in the ρ–θ plane, each pair (ρ,θ) which defines a line through the point (x, y), the resulting curve is a sinusoid. The Line Hough Transform of a point in the x–y plane is thus a sinusoid in the ρ–θ plane. Points in the ρ–θ plane where sinusoids intersect correspond to the existence of a single line in the x–y plane. In practice, the intersection points are detected using an accumulator, which divides the $(x-a)^2 + (y-b)^2 = r^2$ plane into a grid. Each point in the x–y plane produces a vote in a cell in the accumulator. Cells with a large number of votes correspond to an intersection point, which means that a line segment is present in the image in the x–y plane.

Figure 13:
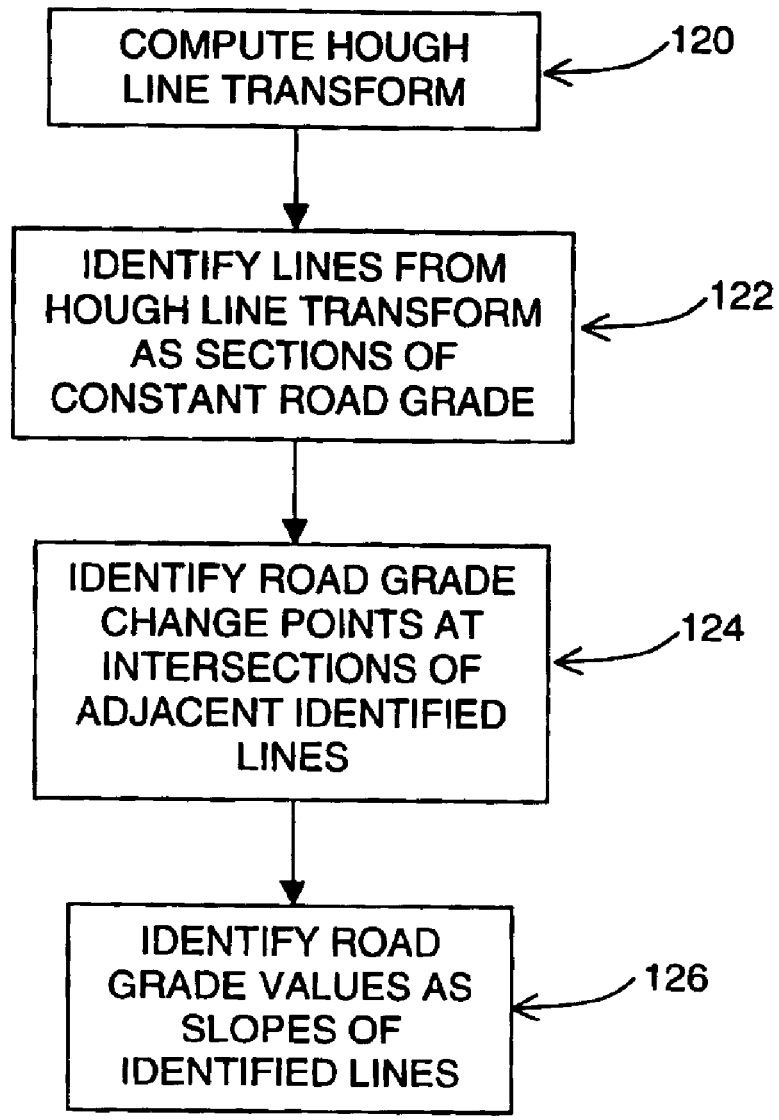
FIG. 13 is a flow chart of the operations of the data collection facility for using the Hough Line Transform to obtain road grade data.

FIG. 13 illustrates the steps performed by the data collection facility 68 to implement the Hough Transform on the altitude and latitude/longitude data to identify road grade data. At step 120, the data collection facility 68 computes the Hough Line Transform with the horizontal distance along the road as the x-axis variable and the corresponding altitude data as the y-axis variable. Horizontal distance is the accumulated distance between consecutive latitude/longitude data points along the road.

Figure 14:
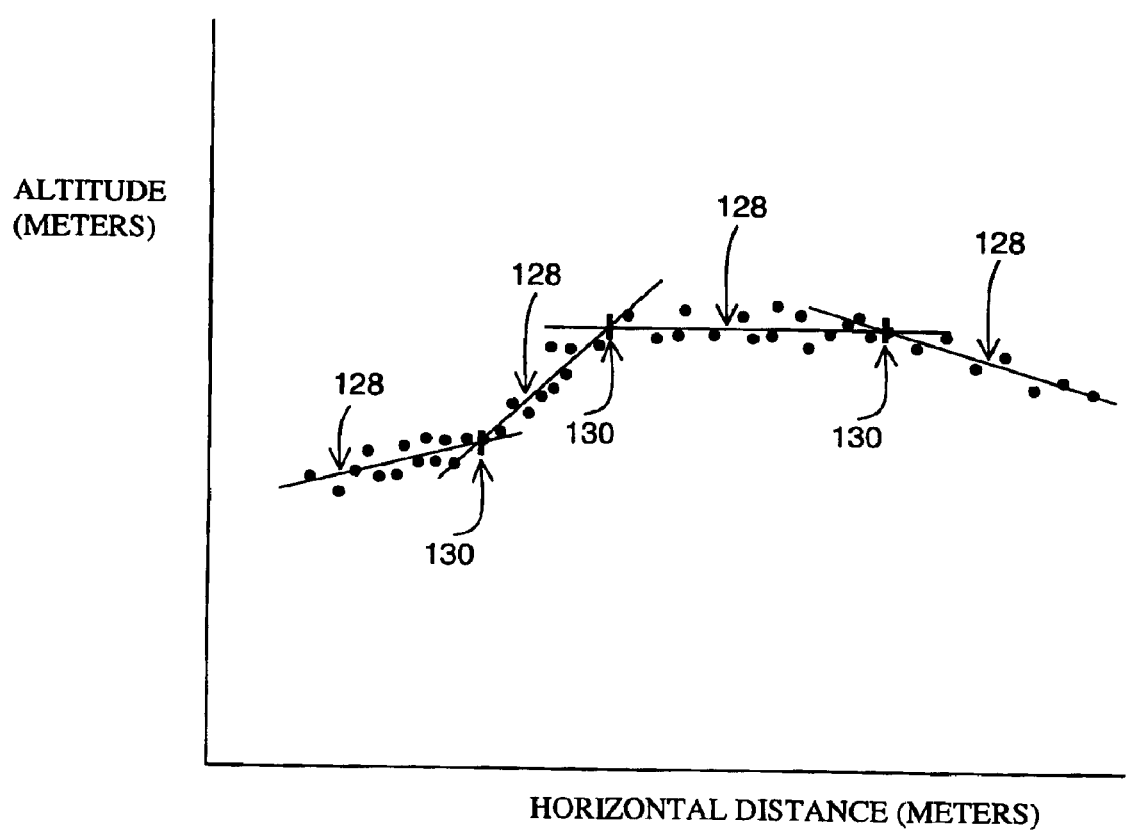
FIG. 14 is a graph of altitude data analyzed using the Line Hough Transform.

As discussed above, the Hough Line Transform identifies lines in the data. At step 122, the data collection facility 68 identifies lines from the Hough Line Transform as sections of constant road grade along the road. FIG. 14 illustrates a graph of altitude versus horizontal distance along a road. The sections of constant road grade correspond to the lines 128 identified with the Hough Line Transform.

At step 124, the data collection facility 68 identifies road grade change points 130 at intersections of adjacent identified lines from the Hough Line Transform. The grade change points 130 in FIG. 14 illustrate locations at which the road grade changes from one section of constant road grade 128 to another section of constant road grade 128. In one embodiment, the location of the grade change points correspond to the latitude and longitude position associated with the intersection point of the adjacent lines.

At step 126, the data collection facility 68 identifies the road grade values of the sections of constant road grade as the slopes of the identified lines from the Hough Line Transform. The Hough Line Transform provides the slope of each line representing a section of constant road grade. The road grade value for each section of constant road grade is the slope value of its corresponding line. Since road grade is typically expressed in percentage, the slope value is converted into a percentage. The direction of the slope of the lines provides the direction of the road grade. For example, a positive slope indicates an incline, a slope of zero represents a flat section, and a negative slope indicates a decline. In another embodiment, the direction of road grade may be determined by comparing the altitude value associated with road grade change points. For example, if one grade change point has a corresponding altitude value greater than the altitude value of the next grade change point indicates an incline.

B. Applications for the Road Grade Data

The road grade data within the geographic database have several applications. First, various driver assistance systems for vehicles that help make travel more efficient and convenient may use the road grade data. For example, one driver assistance system that may use the road grade data is an automatic transmission control system. The automatic transmission control system adjusts the operation of the vehicle transmission to match the grade of the upcoming road. Another driver assistance system that may use the road grade data is an adaptive cruise control system.

It is intended that the foregoing detailed description be regarded as illustrative rather than limiting and that it is understood that the following claims including all equivalents are intended to define the scope of the invention.

We claim:

1. A method of obtaining data for a geographic database comprising:

providing data indicating a plurality of locations along roads, including data indicating altitudes at the plurality of locations;

computing road grade values for a plurality of subsections of the road, each of the subsections being a portion of the road between two of the locations;

identifying a plurality of temporary change points, each of the temporary change points joins two adjacent subsections having road grade values that differ by a value greater than a predetermined amount;

computing a road grade value for each part of the road between adjacent temporary change points;

grouping consecutive parts of the road having road grade values that fall within a predetermined range into at least one constant road grade section; and storing data that define the constant road grade section in the geographic database.

2. The method of claim 1 further comprising filtering the data to remove closely spaced locations.

3. The method of claim 1 further comprising deriving a smooth altitude profile along the road.

4. The method of claim 3 wherein the smooth altitude profile is derived using a least squares polynomial.

5. The method of claim 1 wherein the temporary change points include a plurality of zero-crossing points, wherein each of the zero-crossing points joins two adjacent subsections having road grade values that change from positive to negative.

6. The method of claim 5 wherein the temporary change points include a plurality of pseudo zero-crossing points, wherein each of the pseudo zero-crossing points joins two adjacent subsections between zero crossing points having road grade values that differ by a value greater than a predetermined amount.

7. The method of claim 6 wherein said pseudo zero-crossing points are identified by performing a rotational transformation of an altitude profile between two adjacent zero-crossing points.

8. The method of claim 1 further comprising:

determining whether the constant road grade section has a corresponding road distance less than a minimum distance; and if the constant road grade section has the corresponding road distance less than said minimum distance, merging the constant road grade section with an adjacent constant road grade section.

9. A method of obtaining data for a geographic database comprising:

providing data indicating a plurality of locations along roads, including data indicating altitudes at the plurality of locations;

computing a road grade value for each of a plurality of subsections of said road, each of the subsections defined by two of the locations;

if the road grade values of adjacent subsections fall within a predetermined range, grouping the subsections into at least one constant road grade section; and storing data that define the constant road grade section in the geographic database.

10. The method of claim 9 further comprising deriving a smooth altitude profile along the road.

11. The method of claim 9 further comprising identifying a grade change point corresponding to a position connecting adjacent constant road grade sections.

12. The method of claim 9 further comprising:

determining whether the constant road grade section has a corresponding road distance less than a minimum distance; and if the constant road grade section has the corresponding road distance less than said minimum distance, merging the constant road grade section with an adjacent constant road grade section.

13. The method of claim 9 further comprising computing a road grade value for the constant road grade section.

14. The method of claim 13 further comprising:

if the road grade value of the constant road grade section is greater than a maximum road grade value, identifying the constant road grade section for human inspection.

15. The method of claim 13 further comprising:

if the road grade value of the constant road grade section is greater than a maximum road grade value, merging the constant road grade section with an adjacent constant road grade section.

16. The method of claim 9 further comprising using the data indicating altitudes as an input to a Hough Line Transform to determine straight line segments corresponding with the constant road grade sections.

17. A method of representing road geometry for a geographic database comprising:

providing data indicating a plurality of locations along roads, including data indicating altitudes at the plurality of locations;

computing a road grade value for each of a plurality of subsections of the road, each of said subsections defined by a pair of locations;

if said road grade values of adjacent subsections differ by a value greater than a predetermined amount, identifying said location between said adjacent subsections as a grade change point; and storing data that define said grade change point in the geographic database.

18. The method of claim 17 identifying a road grade value for each constant road grade section between adjacent grade change points.

19. The method of claim 17 further comprising:

determining whether a road distance between adjacent grade change points is less than a minimum distance; and if the road distance between adjacent grade change points is less than said minimum distance, eliminating one of said adjacent grade change points.

* * * * *